Aug. 27, 1968     C. NIENHAUS ET AL     3,398,821
DOUBLE FRICTION CLUTCH FOR MOTOR VEHICLES
Filed Nov. 2, 1966     3 Sheets-Sheet 1

INVENTORS
CLEMENS NIENHAUS
JURGEN VOLLMER
BY Edmund M. Jaskiewicz
ATTORNEY

Aug. 27, 1968  C. NIENHAUS ET AL  3,398,821
DOUBLE FRICTION CLUTCH FOR MOTOR VEHICLES
Filed Nov. 2, 1966  3 Sheets-Sheet 2

INVENTORS
CLEMENS NIENHAUS
JURGEN VOLLMER
BY Edmund M. Jaskiewicz
ATTORNEY

Aug. 27, 1968    C. NIENHAUS ET AL    3,398,821
DOUBLE FRICTION CLUTCH FOR MOTOR VEHICLES
Filed Nov. 2, 1966    3 Sheets-Sheet 3

INVENTORS
CLEMENS NIENHAUS
JURGEN VOLLMER
BY Edmund M. Jaskiewicz
ATTORNEY

United States Patent Office 3,398,821
Patented Aug. 27, 1968

3,398,821
DOUBLE FRICTION CLUTCH FOR
MOTOR VEHICLES
Clemens Nienhaus, Lohmar, and Jurgen Vollmer, Siegburg, Germany, assignors to Firma Jean Wallerscheid KG., Siegburg-Lohmar, Germany, a corporation of Germany
Filed Nov. 2, 1966, Ser. No. 591,599
Claims priority, application Germany, Feb. 18, 1966, W 40,957
8 Claims. (Cl. 192—48.7)

ABSTRACT OF THE DISCLOSURE

A double friction clutch having a shift ring rotatably mounted on the cover plate and advanced progressively upon actuation of the disengaging levers. The shift ring will lock alternately in a selected sequence each of the disengaging lever systems against engagement of the friction clutch connected thereto.

---

The present invention relates to a double friction clutch structure for motor vehicles and the like, more particularly, to an actuating mechanism for such clutches wherein with one actuating lever only one of the two friction clutches can be engaged at a time or both clutches held simultaneously disengaged.

Double clutches have long been used for motor vehicles of many types. Such double clutches generally comprise a pair of coaxially positioned friction clutches which may be disengaged in sequence in response to a common actuating lever. These clutches can then be re-engaged in the opposite sequence. However in such double clutches alternate disengageent and engagement of the clutches or actuation of these clutches in a selected sequence is not possible.

In one form of double clutch, two friction clutches have the actuating or disengaging mechanism contained in a coupling box positioned between the clutches. In the more conventional form of double friction clutch the clutches are positioned coaxially with the disengaging mechanism being located on one end or the other of the clutches. This arrangement poses the problem of devising disengaging mechanism which could be readily compatible with the known clutch lever which is operated by the foot of the operator of the vehicle. In order that such clutches have an operating life of satisfactory duration even when employed under heavy duty conditions such as in construction vehicles, the disengaging mechanism should be subjected only to axial forces during the disengaging operation. It was also desired that the operation of one clutch or the other should be as simple as possible so as not to impose an added burden on the already busy vehicle operator. Further, the operation of each engageable clutch must be readily sensed by the vehicle operator by a pronounced increase in the force required to be extered against the pedal for normal disengagement, but this additional force should not require significant physical exertion on the part of the operator.

It is therefore the principal object of the present invention to provide a novel and improved actuating mechanism for a double friction clutch.

It is another object of the present invention to provide an actuating mechanism for double friction clutches which permits alternate engagement and disengagement of the clutches and, if desired, actuation of the clutches in a selected sequence.

The above objects are attained by the present invention which essentially comprises a clutch housing with a pair of friction disk clutches being coaxially arranged therein. There is a cover plate on one end of the clutch housing and a pair of disengaging lever systems pivotally mounted on the cover plate. These lever systems are actuated by an axially movable sleeve and are connected by suitable linkage to the respective friction clutches. A shift ring is rotatably mounted on the cover plate and has ratchet teeth on the inner periphery thereof. A plurality of rectangular locking members are positioned symmetrically about the circumference of the shift ring underneath one lever system at a time to lock this lever system against engagement of the friction clutch connected thereto. The shift ring is advanced to lock the other lever system against engagement of its friction clutch by means of a carrier lever pivotally mounted on the cover plate. One end of the carrier lever is engageable by one of the lever systems and the other end is drivingly engageable with the shift ring ratchet teeth. Thus actuation of the lever system will pivot the carrier lever to advance the shift ring. Also pivotally mounted on the cover plate is a locking lever which has one end engageable with the shift ring teeth to retain the shift ring in position and to align the locking members on the shift ring with one of the lever systems.

The aligning and locking lever, the carrier lever, and the supporting structure for the shift ring are provided at their point of engagement with anti-friction rollers so as to reduce to a minimum the forces required to operate the actuating mechanism.

The disengaging lever systems are operatively connected to a sliding sleeve in a known manner which is moved axially by a single clutch lever. The operation of this clutch lever provides for the actuation of each friction clutch in a selected sequence. Further, the forces required to be exerted by the vehicle operator on the clutch lever or pedal for simultaneously disengaging both clutches or for selectively disengaging one clutch are different magnitudes so as to preclude any errors in operation on the part of the operator. At the same time the forces are not of such great magnitude as to produce unnecessary physical exertion on the part of the operator.

The actuating mechanism of the present invention occupies a minimum of space so that the entire double friction clutch structure including the actuating mechanism can be readily accommodated in the normal clutch housing of a motor vehicle. Further, the clutch structure is simple and effective in operation, requires a minimum of maintenance and care for successful operation, and can be manufactured at relatively low costs.

Other objects and advantages of the present invention will be apparent upon reference to the accompanying description when taken in conjunction with the following drawings wherein.

Proceeding next to the drawings wherein like reference symbols indicate the same parts throughout the various views a specific embodiment and modifications of the present invention will be described in detail.

Figure 1:
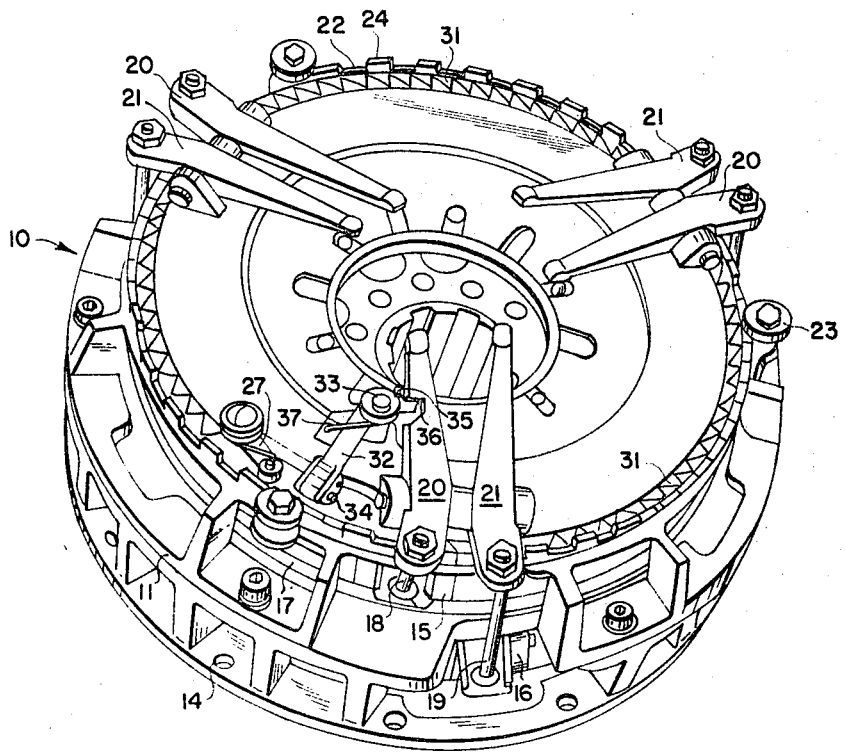
FIGURE 1 is an overall perspective view of the double friction clutch incorporating the actuating mechanism of the present invention.
Figure 2:
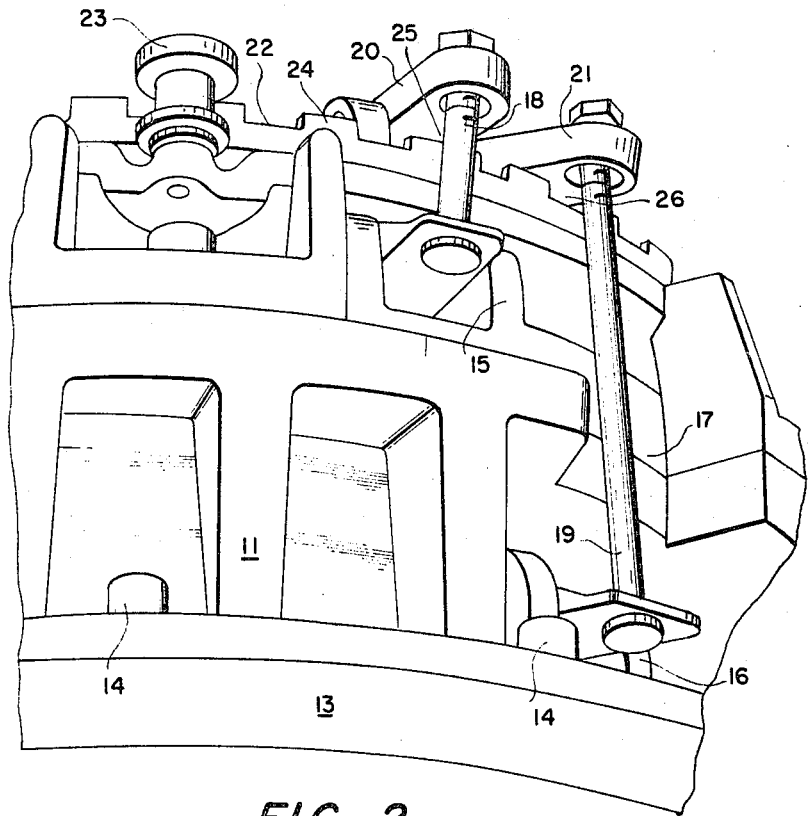
FIGURE 2 is a perspective view of a portion of the clutch structure of FIGURE 1 and showing the locking means for the disengaging levers.
Figure 5:
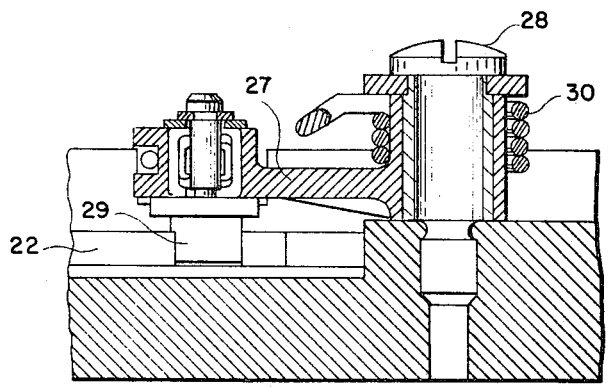
FIGURE 5 is a sectional view taken along the line 5—5 of FIGURE 3 and showing the aligning and locking unit for the shift ring.

As may be seen in FIGURE 1 the clutch structure of the present invention includes a clutch housing indicated generally at 10 and having a cover plate 11. The clutch housing may be mounted upon a fly wheel 13 as shown in FIGURE 2 of the engine by bolts 14.

In FIGURE 1 it can be seen the pressure plate 15 of the upper clutch and the pressure plate 16 of the lower clutch which plates are both loaded by clutch springs (not shown) and are pressed against clutch disk 17. The pressure plates 15 and 16 are connected by tie rods 18 and 19 respectively to disengaging levers 20 and 21 which are pivotally mounted on the cover plate. Three disengaging levers are connected to each pressure plate with the levers connected to the same pressure plate forming a disengaging lever system. The disengaging levers operate in a known manner by a disengagement bearing (not shown) which is operatively connected to the inner ends of the disengaging levers.

Rotatably mounted on the cover plate 11 is a shift ring 22 which is rotatably retained in position by a plurality of antifriction backing rollers 23 spaced about the outer periphery of the shift ring. In an axial direction the shift ring 22 is provided with a plurality of rectangular or trapezoidal locking elements 24. These locking elements are positioned below the disengaging levers 20 and 21 of the particular clutch unit which is to be held in the disengaged position as may be seen in FIGURE 2. For this purpose lugs 25 and 26 are provided on the undersides of disengaging levers 20 and 21 respectively. As may be seen in FIGURE 2 the position of the shift ring 22 has locked the upper clutch in the disengaged position with the lower clutch being free.

On the clutch housing cover plate 11 there is pivotally mounted a locking and aligning lever 27 with its pivot end 28 and having a roller 29 on its free end which is urged into engagement with the inner periphery of the shift ring 22 by a spring 30.

The inner periphery of the shift ring is provided with a plurality of ratchet teeth 31 which are engaged by the roller 29.

A double armed carrier lever 32 is pivotally mounted on pin 33 on the clutch housing cover plate and is operatively connected with a disengaging lever 20 and with the ratchet teeth 31 on the shift ring. One end of the carrier lever 32 is provided with a spring loaded pin 34 which when engaged with the ratchet teeth 31 of the shift ring aligns the locking members 24 with one of the disengaging lever systems. At the other end of the carrier lever 32 there is provided a roller 35 which is engageable with an inclined cam surface 36 formed on the underside of disengaging lever 20 as may be seen in FIGURE 3A. A spring 37 is provided to urge the carrier lever 32 in the clockwise direction against a stop 38 on the cover plate 11.

If desired, a plurality of carrier levers 32 with spring biased pins 34 may be symmetrically positioned on the clutch housing cover plate. The angle to which the carrier lever 32 pivots is adjusted to the pitch of the locking elements 24 on the shift ring 22. The range of the pivoting movement is limited at both extreme positions by adjustable stops such as 38 illustrated in FIGURE 3.

In the operation of the actuating mechanism as described above, axial displacement of a sliding sleeve in a known manner (not shown in the drawings) the disengaging levers 20 and 21 are pivoted and the pressure plates 15 and 16 are lifted under the action of the tie rods 18 and 19 against the force of the clutch springs (not shown) so that the clutch disks are disengaged from frictional engagement. Axial displacement of the sliding sleeve in the reversed direction moves the pressure plates 15 and 16 in close proximity to the clutch disks and then releases the pressure plates from their respective disengaging levers 20 and 21 so that the pressure plates are pressed against the clutch disks by the clutch springs.

According to the present invention when the locking elements 24 on the shift ring 22 are positioned beneath a system of disengaging levers—lever 20 as shown in FIGURE 2—the pressure disc 15 connected with these disengaging levers cannot be brought into frictional engagement with the clutch plate by the clutch springs. Thus, the position of the shift ring 22 alternately locks disengaging lever systems 20 or 21 so that their respective pressure plates 15 and 16 are also locked in the disengaged position.

Figure 3:
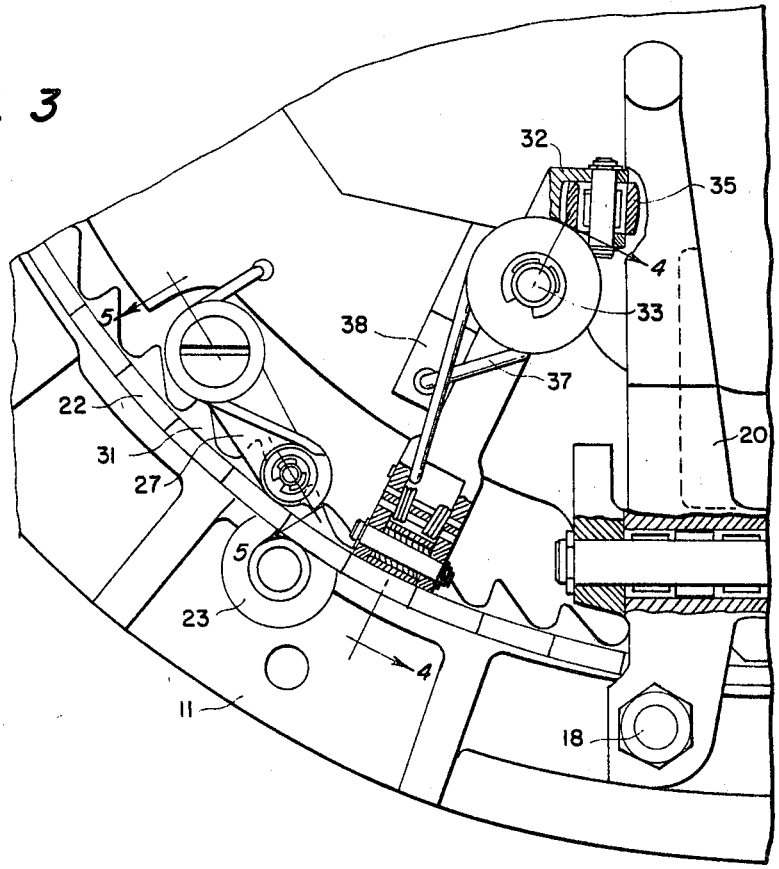
FIGURE 3 is a plan view on enlarged scale of a portion of the cover plate and actuating structure illustrated in FIGURE 1 with portions of the actuating mechanism being shown in section.
Figure 4:
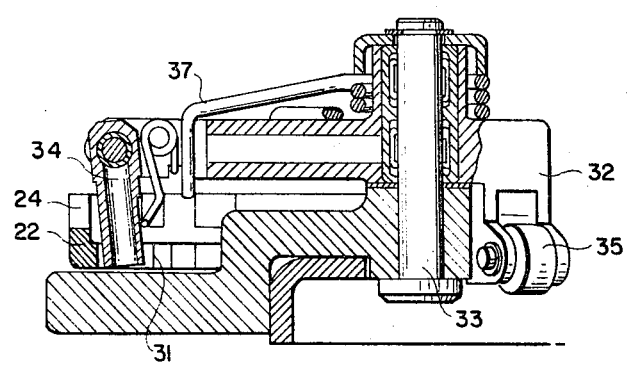
FIGURE 4 is a sectional view taken along the line 4—4 of FIGURE 3 and showing the carrier lever.
Figure 3A:
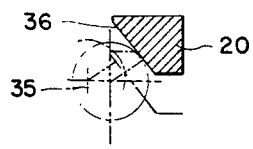
FIGURE 3A is a sectional view taken perpendicularly across the axis of roller 35 on the end of the carrier lever and disengaging lever 20 as viewed in FIGURE 3.

The advancing and positioning of the shift ring 22 are positively controlled by the carrier lever 32 in combination with the locking lever 27. Both of these levers lockingly engage with the ratchet teeth 31 on the shift ring so that locking lever 27 positions the shift ring 22 with respect to the cover 11 while the carrier lever 32 advances stepwise the shift ring 22 upon each actuation of the disengaging levers 20 and 21. When the disengaging lever 20 is pivoted under the action of a sliding sleeve, then its cam surface 36 acts against the roller 35 on the carrier lever 32 to pivot the carrier lever about its pin 33. The spring biased pin 34 on carrier lever 32 is in engagement with the ratchet teeth 31 and thus advances the shift ring 22 through a distance determined by the range of pivoting movement of the carrier lever 32. Since the pitch of the ratchet teeth 31 on the shift ring are selected with respect to the path of pivoting movement of carrier lever 32 and the position and the length of the locking lever 27 are selected with respect to this pitch, it will be apparent that when the disengaging levers 20 and 21 are actuated through their full distance the shift ring 22 will always be rotated through a distance equal to the distance between adjacent ratchet teeth thereon in the event the disengaging levers are not pivoted throughout their entire pivoting range, the shift ring 22 is then returned to its original position by the locking lever 27. This returning movement is accomplished by the spring 30 on the locking lever which urges the locking lever radially outwardly against the shift ring so that its roller 29 engages an inclined surface of a ratchet tooth 31 on the shift ring to move the shift ring back to its original position as shown in FIGURE 3.

Since friction forces are considerably reduced by the use of the antifriction rollers 23 to position the shift ring 22 and the antifriction roller 29 on the locking lever 27 each pivoting movement of the disengaging lever positively advances the shift ring to the next alternate locking position of the clutch structure.

It is therefore apparent that with each partial stroke of the clutch foot pedal which actuates the shift sleeve both clutches will always be disengaged because the disengaging lever of the engaged clutch will be pivoted to the approximate position of the disengaging lever of the disengaged clutch. Releasing the clutch foot pedal from this partial stroke will result in one of the clutches being engaged. However, when the clutch foot pedal is depressed throughout its entire stroke then a change in the locking position of the clutches occurs since, as described above, the disengaging levers are pivoted throughout their full range of movement and accordingly the shift ring is advanced to lockingly engage the previously engaged clutch while the clutch which was previously held in the disengaged position is brought positively into engagement.

It is further pointed out that after the engaged clutch has been disengaged there is no load upon the mechanism for advancing the shift ring so that only a small force is required to advance the shift ring. This small force is readily attained from a small additional travel of the clutch foot pedal. This shift ring advancing operation can be clearly sensed by the vehicle operator because of the slight increase in power required to depress the foot pedal. The actuating mechanism of the present invention has the additional advantage that while dirt, friction, or wear occurring after long periods of use may have some effects on this mechanism, the mechanism will not fail and will continue to operate. The simplicity of structure of this actuating mechanism and the small forces required to operate the same provide an actuating mechanism which can be advantageously used on numerous types of double friction clutches including heavy duty clutches used on motor vehicles, construction vehicle, and the like.

It is understood that this invention is susceptible to modifications in order to adapt it to different usages and conditions, and accordingly, it is desired to comprehend such modifications within this invention as may fall within the scope of the appended claims.

What is claimed is:

1. In a double friction clutch structure for motor vehicles, the combination of a clutch housing having a cover plate on one end thereof, a pair of coaxially arranged friction clutches within said housing, a pair of actuable disengaging lever systems for said friction clutches and pivotally mounted on said cover plate, linkage means operatively connecting said lever systems with the respective friction clutches, means on said cover plate including a shiftable element rotatable relative to the cover plate and about the clutch axis for locking alternately in a selected sequence each of said lever systems against engagement of the friction clutch connected thereto, and means on said cover plate for positioning said locking means to lock one of said lever systems in response to actuation of said lever systems.

2. In a double friction clutch structure as claimed in claim 1 with the shiftable element comprising a shift ring rotatably mounted on said cover plate, said locking means being on said shift ring.

3. In a double friction clutch structure as claimed in claim 2 with said shift ring having ratchet teeth on the inner periphery thereof, and means on said cover plate engaging said shift ring teeth for locking said shift ring against rotation and aligning said locking means with one of said lever systems.

4. In a double friction clutch structure as claimed in claim 2 with said shift ring having ratchet teeth on the inner periphery thereof, and a carrier lever pivotally mounted on said cover plate and having one end engageable by one of said lever systems and the other end drivingly engageable with said shaft ring teeth to advance said shift ring in response to actuation of said lever systems.

5. In a double friction clutch structure as claimed in claim 3 and further comprising antifriction roller on said shift ring locking means engaging said shift ring teeth.

6. In a double friction clutch structure as claimed in claim 4 and further comprising antifriction rollers on the one end of said carrier lever engageable with one of said lever systems.

7. In a double friction clutch structure as claimed in claim 2 and futrher comprising antifriction rollers engaging the outer periphery of said shift ring to rotatably retain said shift ring on said cover plate.

8. In a double friction clutch as claimed in claim 1 and further comprising a shift ring rotatbly mounted on said cover plate, said locking means being on said shift ring, said shift ring having ratchet teeth on the inner periphery thereof, means on said cover plate engaging said shift ring teeth for locking said shift ring against rotation and aligning said locking means with one of said lever systems, and a carrier lever pivotally mounted on said cover plate and having one end engageable by one of said lever systems and the other end drivingly engageable with said shift ring teeth to advance said shift ring in response to actuation of said lever systems.

References Cited
UNITED STATES PATENTS

| | | | |
|---|---|---|---|
| 2,231,411 | 2/1941 | Lawrence | 192—48 |
| 2,371,804 | 3/1945 | Cooke | 192—48 |
| 2,853,892 | 9/1958 | Sheppard | 192—48 |
| 3,179,220 | 4/1965 | Sink | 192—48 |

BENJAMIN W. WYCHE III, *Primary Examiner.*

L. J. PAYNE, *Assistant Examiner.*